(12) United States Patent
Feng et al.

(10) Patent No.: US 12,309,017 B2
(45) Date of Patent: May 20, 2025

(54) SIGNAL PROCESSING METHOD AND APPARATUS

(71) Applicant: Beijing University of Posts and Telecommunications, Beijing (CN)

(72) Inventors: Zhiyong Feng, Beijing (CN); Sai Huang, Beijing (CN); Yifan Zhao, Beijing (CN); Qixun Zhang, Beijing (CN); Zhiqing Wei, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 55 days.

(21) Appl. No.: 18/245,762

(22) PCT Filed: Jul. 19, 2021

(86) PCT No.: PCT/CN2021/107033
§ 371 (c)(1),
(2) Date: Mar. 17, 2023

(87) PCT Pub. No.: WO2022/179040
PCT Pub. Date: Sep. 1, 2022

(65) Prior Publication Data
US 2023/0396482 A1    Dec. 7, 2023

(30) Foreign Application Priority Data
Feb. 24, 2021 (CN) .......................... 202110205794.5

(51) Int. Cl.
*H04L 27/26* (2006.01)
*H04L 5/00* (2006.01)
(52) U.S. Cl.
CPC ........ *H04L 27/2675* (2013.01); *H04L 5/0048* (2013.01); *H04L 27/2666* (2013.01)

(58) Field of Classification Search
CPC ............. H04L 27/2613; H04L 27/2675; H04L 5/0048; H04L 27/2666; H04L 5/0007; H04L 5/0058
See application file for complete search history.

(56) References Cited

U.S. PATENT DOCUMENTS

| | | | |
|---|---|---|---|
| 2005/0099939 A1 | 5/2005 | Huh et al. | |
| 2006/0072604 A1* | 4/2006 | Sutivong | H04W 74/002 370/437 |

(Continued)

FOREIGN PATENT DOCUMENTS

| | | |
|---|---|---|
| CN | 109061633 A | 12/2018 |
| CN | 109085575 A | 12/2018 |

(Continued)

OTHER PUBLICATIONS

International Search Report/Written Opinion dated Nov. 23, 2021 in related/corresponding PCT Application No. PCT/CN2021/107033, including partial English translation.

(Continued)

*Primary Examiner* — Aristocratis Fotakis
(74) *Attorney, Agent, or Firm* — PATENT PORTFOLIO BUILDERS PLLC

(57) ABSTRACT

Embodiments of the present invention provide a signal processing method and apparatus, a first device determines a target insertion position of a pilot sequence in a first frequency-domain signal based on the data bits in a first sub-data signal obtained by dividing data bits in a data signal, combines the pilot sequences with a second sub-data signal obtained by dividing the data signal according to the determined target insertion positions, to obtain the first frequency-domain signal; sends the pulse signal corresponding to the first frequency-domain signal to the second device. The second device determines the pilot sequences in the first frequency-domain signal corresponding to the pulse signal (Continued)

and determines the data bits corresponding to the insertion position of each of the pilot sequences in the first frequency-domain signal, to obtain the first sub-data signal; demodulates subcarriers in the first frequency-domain signal other than the pilot sequences, to obtain the second sub-data signal; splices the first sub-data signal and the second sub-data signal, to obtain the corresponding data signal. Based on the above processing, spectrum resource utilization rate can be improved.

10 Claims, 4 Drawing Sheets

(56) References Cited

U.S. PATENT DOCUMENTS

| | | | |
|---|---|---|---|
| 2007/0211619 | A1 | 9/2007 | Jalloul et al. |
| 2008/0299984 | A1* | 12/2008 | Shimomura ........ H04W 52/325 455/446 |
| 2009/0237292 | A1 | 9/2009 | Tigrek et al. |
| 2010/0172427 | A1* | 7/2010 | Kleider ............... H04L 25/0232 375/295 |
| 2010/0290545 | A1* | 11/2010 | Kim ........................ H04L 25/02 375/295 |
| 2023/0308238 | A1* | 9/2023 | Yuan ..................... H04L 5/0051 |
| 2023/0308248 | A1* | 9/2023 | Katla .................... H04L 5/0044 |

FOREIGN PATENT DOCUMENTS

| | | |
|---|---|---|
| CN | 110412557 A | 11/2019 |
| CN | 111198355 A | 5/2020 |
| CN | 111245759 A | 6/2020 |
| CN | 111327551 A | 6/2020 |
| CN | 111585644 A | 8/2020 |
| CN | 111880171 A | 11/2020 |
| CN | 113067790 A | 7/2021 |
| KR | 20060133869 A | 12/2006 |
| WO | 2018036174 A1 | 3/2018 |

OTHER PUBLICATIONS

Nan Jiang et al., "Joint Power Control and Time Allocation for Joint Radar and Communication System in Cognitive Radio Enabled Vehicular Ad-hoc Networks," 2019 6th International Conference on Dependable Systems and Their Applications (DSA), pp. 470-474.

Yifan Zhao, "Integrated Waveform Design of Radar and Communications Based on OFDM," Master's Dissertation of Beijing University of Posts and Telecommunications, Jun. 30, 2021, 64 pages, including partial English translation.

* cited by examiner

SIGNAL PROCESSING METHOD AND APPARATUS

TECHNICAL FIELD

The present invention relates to the technical field of communications, in particular to a signal processing method and apparatus.

BACKGROUND

A vehicle (which can be called a first vehicle) in the Internet of Vehicles system based on integrated radar and communication can generate a pulse signal carrying radar signals and data signals and send the pulse signal to another vehicle (which can be called a second vehicle). When the pulse signal reaches the second vehicle, it will be reflected as an echo signal to the first vehicle. Further, the first vehicle can determine the distance to the second vehicle and the current speed of the second vehicle relative to the first vehicle according to the echo signal.

In the prior art, a frequency-domain signal including a pilot sequence and a data signal can be generated, wherein the pilot sequence is used as a radar signal, and the pilot sequence is a specified subcarrier and a specified OFDM (Orthogonal Frequency Division Multiplexing) symbol in the frequency-domain signal, wherein one subcarrier is a row vector of the frequency-domain signal, and one OFDM symbol is a column vector of the frequency-domain signal. In the frequency-domain signal, elements other than the above specified subcarrier and specified OFDM symbol are data signals to be transmitted. Then, the inverse fast discrete Fourier transform is performed on the frequency-domain signal to obtain the pulse signal.

However, since one subcarrier and one OFDM symbol in the frequency-domain signal are set as pilot sequences, in order to be able to send a complete data signal, it is necessary to increase the number of subcarriers and OFDM symbols contained in the frequency-domain signal. In other words, spectrum resources used for transmitting data signals need to be increased, which in turn leads to a low utilization rate of spectrum resources.

SUMMARY

An objective of the embodiments of the present application is to provide a signal processing method and apparatus, to improve spectrum resource utilization rate. The specific technical solutions are as follows.

In a first aspect, in order to achieve the above objective, an embodiment of the present invention provides a signal processing system, the signal processing system comprises a first device and a second device, wherein:

the first device is configured to divide data bits in a data signal to be transmitted based on the number of multiple preset pilot sequences, to obtain a first sub-data signal and a second sub-data signal; determine, as a target insertion position, an insertion position of each of the pilot sequences in a first frequency-domain signal to be generated based on data bits in the first sub-data signal, and a preset correspondence between an insertion position and data bits; combine the pilot sequences with the second sub-data signal according to the determined target insertion positions, to obtain the first frequency-domain signal; wherein, the second sub-data signal is located at insertion positions in the first frequency-domain signal other than the target insertion positions; perform inverse fast discrete Fourier transform on the first frequency-domain signal, to obtain a pulse signal; and send the pulse signal to the second device. The second device is configured to perform discrete Fourier transform on the pulse signal, to obtain a frequency-domain signal corresponding to the pulse signal as the first frequency-domain signal; for each subcarrier in the first frequency-domain signal, perform correlation processing on the subcarrier and the pilot sequences stored locally in the second device, to obtain a vector corresponding to the subcarrier as a target vector; if there is a target element in the target vector, then determine the subcarrier as a pilot sequence; wherein the target element is greater than an element adjacent to the target element; for the insertion position of each of the pilot sequences in the first frequency-domain signal, determine the data bits corresponding to the insertion position based on the preset correspondence between an insertion position and data bits, to obtain the first sub-data signal; demodulate subcarriers in the first frequency-domain signal other than the pilot sequences, to obtain the second sub-data signal; splice the first sub-data signal and the second sub-data signal, to obtain the data signal sent by the first device.

In a second aspect, in order to achieve the above objective, an embodiment of the present invention provides a signal processing method, which is applied to a first device in a signal processing system that further comprises a second device, wherein the signal processing method comprises: dividing data bits in a data signal to be transmitted based on the number of multiple preset pilot sequences, to obtain a first sub-data signal and a second sub-data signal; determining, as a target insertion position, an insertion position of each of the pilot sequences in a first frequency-domain signal to be generated based on data bits in the first sub-data signal, and a preset correspondence between an insertion position and data bits; combining the pilot sequences with the second sub-data signal according to the determined target insertion positions, to obtain the first frequency-domain signal; wherein, the second sub-data signal is located at insertion positions in the first frequency-domain signal other than the target insertion positions; performing inverse fast discrete Fourier transform on the first frequency-domain signal, to obtain a pulse signal; sending the pulse signal to the second device, so that the second device performs discrete Fourier transform on the received pulse signal, to obtain a frequency-domain signal corresponding to the pulse signal as the first frequency-domain signal; for each subcarrier in the first frequency-domain signal, performs correlation processing on the subcarrier and the pilot sequences stored locally in the second device, to obtain a vector corresponding to the subcarrier as a target vector; if there is a target element in the target vector, then determines the subcarrier as a pilot sequence; for the insertion position of each of the pilot sequences in the first frequency-domain signal, determines data bits corresponding to the insertion position based on the preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device; wherein, the target element is greater than an element adjacent to the target element.

In a third aspect, in order to achieve the above objective, an embodiment of the present invention provides a signal processing method, which is applied to a second device in a signal processing system that further comprises a first device, wherein the signal processing method comprises: when receiving a pulse signal sent by the first device, performing discrete Fourier transform on the pulse signal, to obtain a frequency-domain signal corresponding to the pulse signal as a first frequency-domain signal; wherein, the pulse signal is obtained by the first device performing inverse fast discrete Fourier transform on the first frequency-domain signal; the first frequency-domain signal is obtained by the first device as follows: dividing data bits in a data signal to be transmitted based on the number of multiple preset pilot sequences, to obtain a first sub-data signal and a second sub-data signal, and determining, as a target insertion position, an insertion position of each of the pilot sequences in a first frequency-domain signal to be generated based on data bits in the first sub-data signal, and a preset correspondence between an insertion position and data bits; combining the pilot sequences with the second sub-data signal according to the determined target insertion positions; wherein, the second sub-data signal is located at insertion positions in the first frequency-domain signal other than the target insertion positions; for each subcarrier in the first frequency-domain signal, performing correlation processing on the subcarrier and the locally stored pilot sequences, to obtain a vector corresponding to the subcarrier as a target vector; if there is a target element in the target vector, determining the subcarrier as the pilot sequence; wherein the target element is greater than an element adjacent to the target element; for the insertion position of each of the pilot sequences in the first frequency-domain signal, determining data bits corresponding to the insertion position based on the preset correspondence between an insertion position and data bits, to obtain the first sub-data signal; demodulating subcarriers in the first frequency-domain signal other than the pilot sequences, to obtain the second sub-data signal; splicing the first sub-data signal and the second sub-data signal, to obtain the data signal sent by the first device.

In a fourth aspect, in order to achieve the above objective, an embodiment of the present invention provides a signal processing apparatus, which is applied to a first device in a signal processing system that further comprises a second device, wherein the signal processing apparatus comprises: a dividing module, configured for dividing data bits in a data signal to be transmitted based on the number of multiple preset pilot sequences, to obtain a first sub-data signal and a second sub-data signal; a determining module, configured for determining, as a target insertion position, an insertion position of each of the pilot sequences in a first frequency-domain signal to be generated based on data bits in the first sub-data signal, and a preset correspondence between an insertion position and data bits; a combining module, configured for combining the pilot sequences with the second sub-data signal according to the determined target insertion positions, to obtain the first frequency-domain signal; wherein, the second sub-data signal is located at insertion positions in the first frequency-domain signal other than the target insertion positions; a generating module, configured for performing inverse fast discrete Fourier transform on the first frequency-domain signal, to obtain a pulse signal; a sending module, configured for sending the pulse signal to the second device, so that the second device performs discrete Fourier transform on the received pulse signal, to obtain a frequency-domain signal corresponding to the pulse signal as the first frequency-domain signal; for each subcarrier in the first frequency-domain signal, performs correlation processing on the subcarrier and the pilot sequences stored locally in the second device, to obtain a vector corresponding to the subcarrier as a target vector; if there is a target element in the target vector, then determines the subcarrier as a pilot sequence; for the insertion position of each of the pilot sequences in the first frequency-domain signal, determines data bits corresponding to the insertion position based on the preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device; wherein, the target element is greater than an element adjacent to the target element.

In a fifth aspect, in order to achieve the above objective, an embodiment of the present invention provides a signal processing apparatus, which is applied to a second device in a signal processing system that further comprises a first device, wherein the signal processing apparatus comprises: a first determining module, configured for: when receiving a pulse signal sent by the first device, performing discrete Fourier transform on the pulse signal, to obtain a frequency-domain signal corresponding to the pulse signal as a first frequency-domain signal; wherein, the pulse signal is obtained by the first device performing inverse fast discrete Fourier transform on the first frequency-domain signal; the first frequency-domain signal is obtained by the first device as follows: dividing data bits in a data signal to be transmitted based on the number of multiple preset pilot sequences, to obtain a first sub-data signal and a second sub-data signal, and determining, as a target insertion position, an insertion position of each of the pilot sequences in a first frequency-domain signal to be generated based on data bits in the first sub-data signal, and a preset correspondence between an insertion position and data bits; combining the pilot sequences with the second sub-data signal according to the determined target insertion positions; wherein, the second sub-data signal is located at insertion positions in the first frequency-domain signal other than the target insertion positions; a second determining module, configured for: for each subcarrier in the first frequency-domain signal, performing correlation processing on the subcarrier and the locally stored pilot sequences, to obtain a vector corresponding to the subcarrier as a target vector; a third determining module, configured for: if there is a target element in the target vector, determining the subcarrier as the pilot sequence; wherein the target element is greater than an element adjacent to the target element; a fourth determining module, configured for: for the insertion position of each of the pilot sequences in the first frequency-domain signal, determining data bits corresponding to the insertion position based on the preset correspondence between an insertion position and data bits, to obtain the first sub-data signal; a demodulating module, configured for demodulating subcarriers in the first frequency-domain signal other than the pilot sequences, to obtain the second sub-data signal; a splicing module, configured for splicing the first sub-data signal and the second sub-data signal, to obtain the data signal sent by the first device.

An embodiment of the present invention provides an electronic device, comprising a processor, a communication interface, a memory and a communication bus, wherein the processor, the communication interface, and the memory are communicated with each other through the communication bus, and the memory is configured to store a computer program; the processor is configured to execute the program stored on the memory to implement the steps of the signal processing method of any of the second aspect or the third aspect.

An embodiment of the present invention provides a computer-readable storage medium having stored a computer program thereon which, when executed by a processor, causes the processor to perform the steps of the signal processing method of any of the second aspect or the third aspect.

An embodiment of the present invention provides a computer program product, the computer program product includes computer instructions which, when executed by a processor, causes the processor to perform the signal processing method of any of the second aspect or the third aspect.

In the technical solutions provided by the embodiments of the present application, the first device determines a target insertion position of a pilot sequence in a first frequency-domain signal based on the data bits in a first sub-data signal obtained by dividing data bits in the data signal, and a preset correspondence between an insertion position and data bits; combines the pilot sequences with the second sub-data signal obtained by dividing the data bits in the data signal according to the determined target insertion positions, to obtain the first frequency-domain signal; sending the pulse signal corresponding to the first frequency-domain signal to the second device. For each subcarrier in the first frequency-domain signal corresponding to the pulse signal, the second device performs correlation processing on the subcarrier and the pilot sequences stored locally, to obtain a target vector corresponding to the subcarrier; if there is a target element in the target vector, then determines the subcarrier as the pilot sequence; for the insertion position of each of the pilot sequences in the first frequency-domain signal, determines the data bits corresponding to the insertion position based on a preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device. Wherein, the target element is greater than an element adjacent to the target element.

Based on the above processing, although some subcarriers in the first frequency-domain signal also need to be set as pilot sequences, the second device can determine the data signal to be transmitted based on the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved. Of course, any product or method implementing the present application does not necessarily need to achieve all the above-mentioned advantages at the same time.

BRIEF DESCRIPTION OF THE DRAWINGS

In order to more clearly illustrate the embodiments of the present invention or the technical solutions in the prior art, the accompanying drawings that need to be used in the description of the embodiments or the prior art are briefly introduced below. Obviously, the accompanying drawings in the following description are only for some embodiments of the present invention, and those skilled in the art can obtain other embodiments according to these drawings without any creative effort.

DETAILED DESCRIPTION

Figure 1:
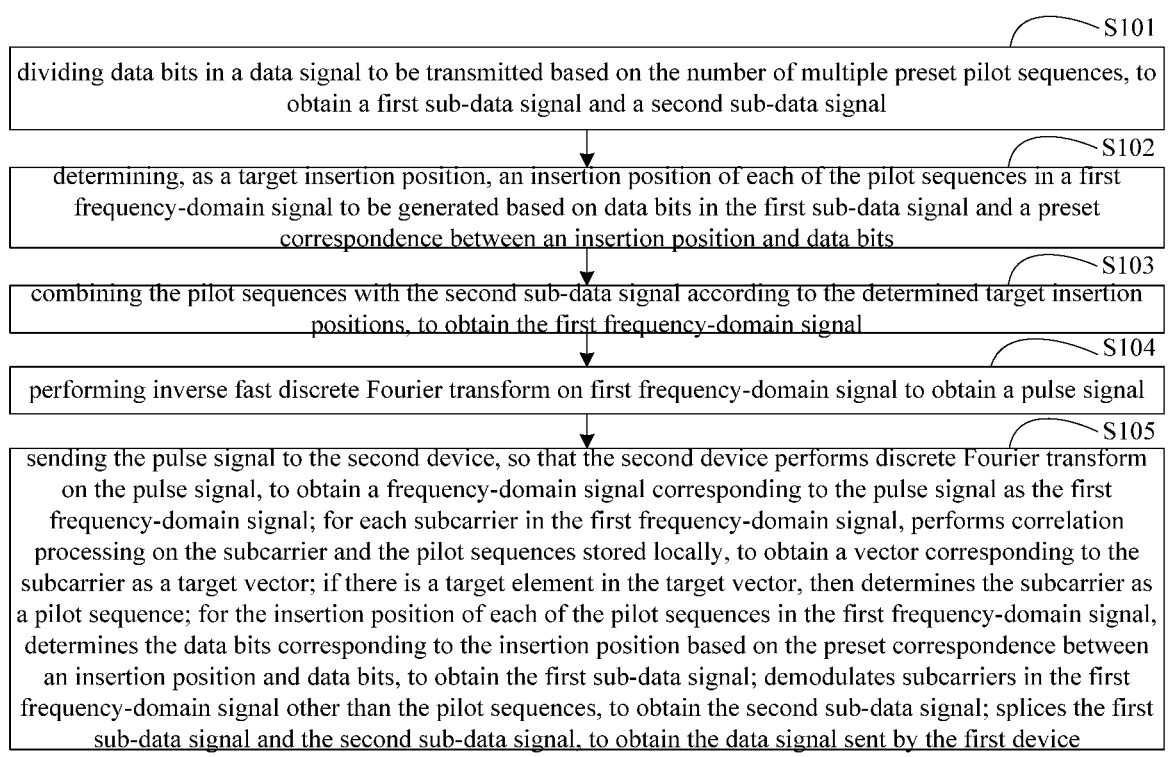
FIG. 1 is a flowchart of a signal processing method provided by an embodiment of the present invention.

The technical solutions in the embodiments of the present invention will be described below clearly and completely with reference to the accompanying drawings in the embodiments of the present invention. Obviously, the described embodiments are only some, not all, embodiments of the present invention. Based on the embodiments of the present invention, all other embodiments obtained by those of ordinary skill in the art based on the present application fall within the protection scope of the present invention.

An embodiment of the present invention provides a signal processing system, which comprises a first device and a second device, wherein:

the first device can divide data bits in a data signal to be transmitted based on the number of multiple preset pilot sequences, to obtain a first sub-data signal and a second sub-data signal; determine, as a target insertion position, an insertion position of each of the pilot sequences in a first frequency-domain signal to be generated based on data bits in the first sub-data signal, and a preset correspondence between an insertion position and data bits; combine the pilot sequences with the second sub-data signal according to the determined target insertion positions, to obtain the first frequency-domain signal; wherein, the second sub-data signal is located at insertion positions in the first frequency-domain signal other than the target insertion positions; perform inverse fast discrete Fourier transform on the first frequency-domain signal, to obtain a pulse signal; and send the pulse signal to the second device. The second device can perform discrete Fourier transform on the received pulse signal, to obtain a frequency-domain signal corresponding to the pulse signal as the first frequency-domain signal; for each subcarrier in the first frequency-domain signal, perform correlation processing on the subcarrier and the pilot sequences stored locally in the second device, to obtain a vector corresponding to the subcarrier as a target vector; if there is a target element in the target vector, then determine the subcarrier as a pilot sequence; wherein the target element is greater than an element adjacent to the target element; for the insertion position of each of the pilot sequences in the first frequency-domain signal, determine the data bits corresponding to the insertion position based on the preset correspondence between an insertion position and data bits, to obtain the first sub-data signal; demodulate subcarriers in the first frequency-domain signal other than the pilot sequences, to obtain the second sub-data signal; splice the first sub-data signal and the second sub-data signal, to obtain the data signal sent by the first device.

Based on the signal processing system provided by the embodiment of the present invention, although some subcarriers in the first frequency-domain signal also need to be set as pilot sequences, the second device can determine the data signal to be transmitted based on the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved.

For other embodiments of the foregoing signal processing system, reference can be made to subsequent relevant introductions about method embodiments involving the first device and the second device.

Referring to FIG. 1, FIG. 1 is a flowchart of a signal processing method provided by an embodiment of the present invention. The method can be applied to the first device in the above-mentioned signal processing system that further comprises a second device. The method can include the following steps:

S101: dividing data bits in a data signal to be transmitted based on the number of multiple preset pilot sequences, to obtain a first sub-data signal and a second sub-data signal.

S102: determining, as a target insertion position, an insertion position of each of the pilot sequences in a first frequency-domain signal to be generated based on data bits in the first sub-data signal and a preset correspondence between an insertion position and data bits.

S103: combining the pilot sequences with the second sub-data signal according to the determined target insertion positions, to obtain the first frequency-domain signal. Wherein, the second sub-data signal is located at insertion positions in the first frequency-domain signal other than the target insertion positions.

S104: performing inverse fast discrete Fourier transform on the first frequency-domain signal, to obtain a pulse signal.

S105: sending the pulse signal to the second device, so that the second device performs discrete Fourier transform on the pulse signal, to obtain a frequency-domain signal corresponding to the pulse signal as the first frequency-domain signal; for each subcarrier in the first frequency-domain signal, performs correlation processing on the subcarrier and the pilot sequences stored locally in the second device, to obtain a vector corresponding to the subcarrier as a target vector; if there is a target element in the target vector, then determines the subcarrier as a pilot sequence; for the insertion position of each of the pilot sequences in the first frequency-domain signal, determines the data bits corresponding to the insertion position based on the preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device. Wherein, the target element is greater than an element adjacent to the target element.

Based on the signal processing method provided by the embodiment of the present invention, although some subcarriers in a first frequency-domain signal also need to be set as pilot sequences, the second device can determine the data signal to be transmitted based on the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved.

In step S102, the signal processing system can be a communication system using integrated radar and communication technology. For example, the signal processing system can be an Internet of Vehicles system, correspondingly, the first device can be any vehicle in the Internet of Vehicles system, and the second device can be a vehicle in the Internet of Vehicles system that receives the pulse signal sent by the first vehicle. Multiple preset pilot sequences are the same, and the preset pilot sequences can be sequences with strong autocorrelation. For example, they can be Barker codes, or M sequences, or gold sequences.

Figure 2:
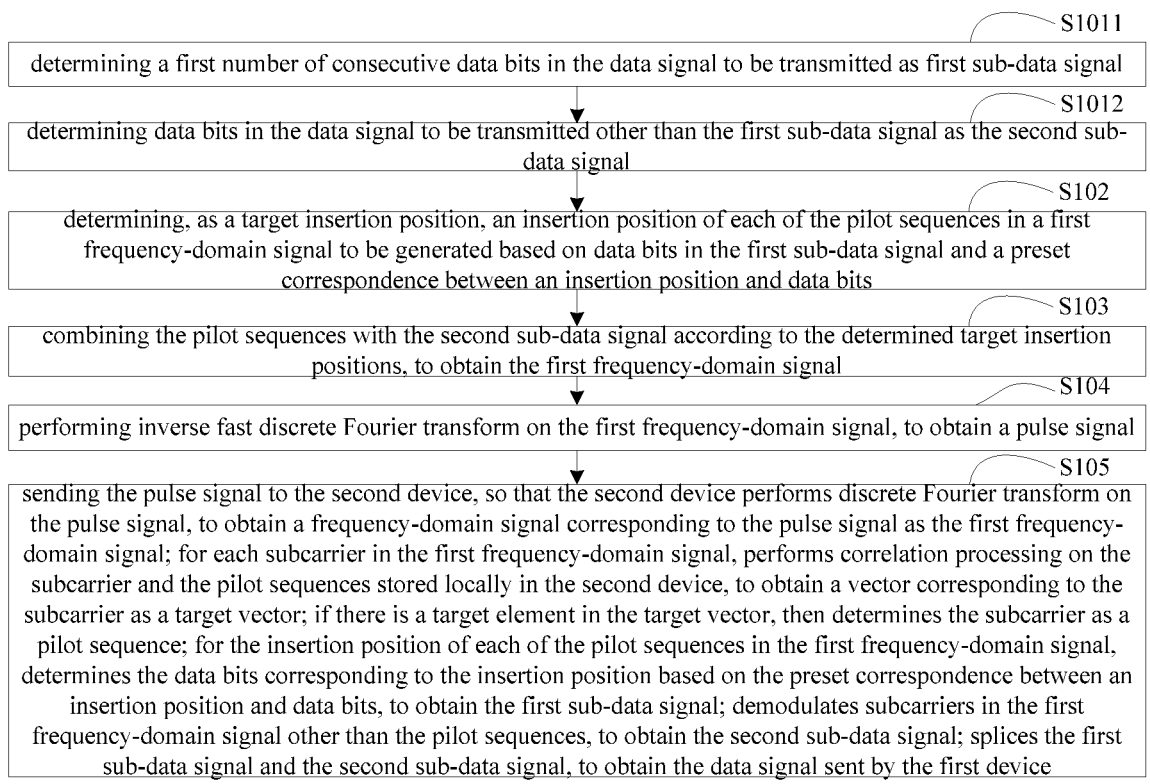
FIG. 2 is a flowchart of another signal processing method provided by an embodiment of the present invention.

In an embodiment of the present invention, referring to FIG. 2, step S101 can include the following steps:

S1011: determining a first number of consecutive data bits in the data signal to be transmitted as the first sub-data signal. Wherein, the first sub-data signal is the frontmost first number of data bits in the data signal to be transmitted, or the first sub-data signal is the rearmost first number of data bits in the data signal to be transmitted; the first number is a preset multiple of the number of the pilot sequences.

S1012: determining data bits in the data signal to be transmitted other than the first sub-data signal as the second sub-data signal.

The first number is a preset multiple of the number of pilot sequences, and the preset multiple can be 2, or the preset multiple can also be 3, to which it is not limited. The number of pilot sequences can be set empirically by a technician. For example, when the number of pilot sequences is 3 and the preset multiple is 2, the first number is 6; or, when the number of pilot sequences is 4 and the preset multiple is 3, the first number is 12, to which is not limited.

For example, the data signal to be transmitted can be: 11101110000110101100101001010100, the number of pilot sequences is 2, and the preset multiple is 2. Correspondingly, the first number is 4. Furthermore, the first device can determine that the first 4 data bits (that is, 1110) in the data signal to be transmitted are the first sub-data signal, or the first device can determine that the last 4 data bits (that is, 0100) in the data signal to be transmitted are the first sub-data signal.

In step S102, the preset correspondence between an insertion position and data bits can be: the correspondence between a decimal value representing the insertion position and binary data bits. The bit number of data bits is the same as the preset multiple. For example, if the preset multiple is 2, the data bits in the above correspondence are two binary bits, for example, the insertion position 0 corresponds to the data bits 00, and the insertion position 1 corresponds to the data bits 01. Alternatively, if the preset multiple is 3, the data bits in the above correspondence are three binary bits. For example, the insertion position 0 corresponds to data bits 000, and the insertion position 1 corresponds to data bits 001. The insertion position represents the position of a subcarrier in the first frequency-domain signal. For example, the insertion position is 0, which corresponds to the first subcarrier in the first frequency-domain signal; the insertion position is 1, which corresponds to the second subcarrier in the first frequency-domain signal; the insertion position is 2, which corresponds to the third subcarrier in the first frequency-domain signal, and so on and so forth.

Figure 3:
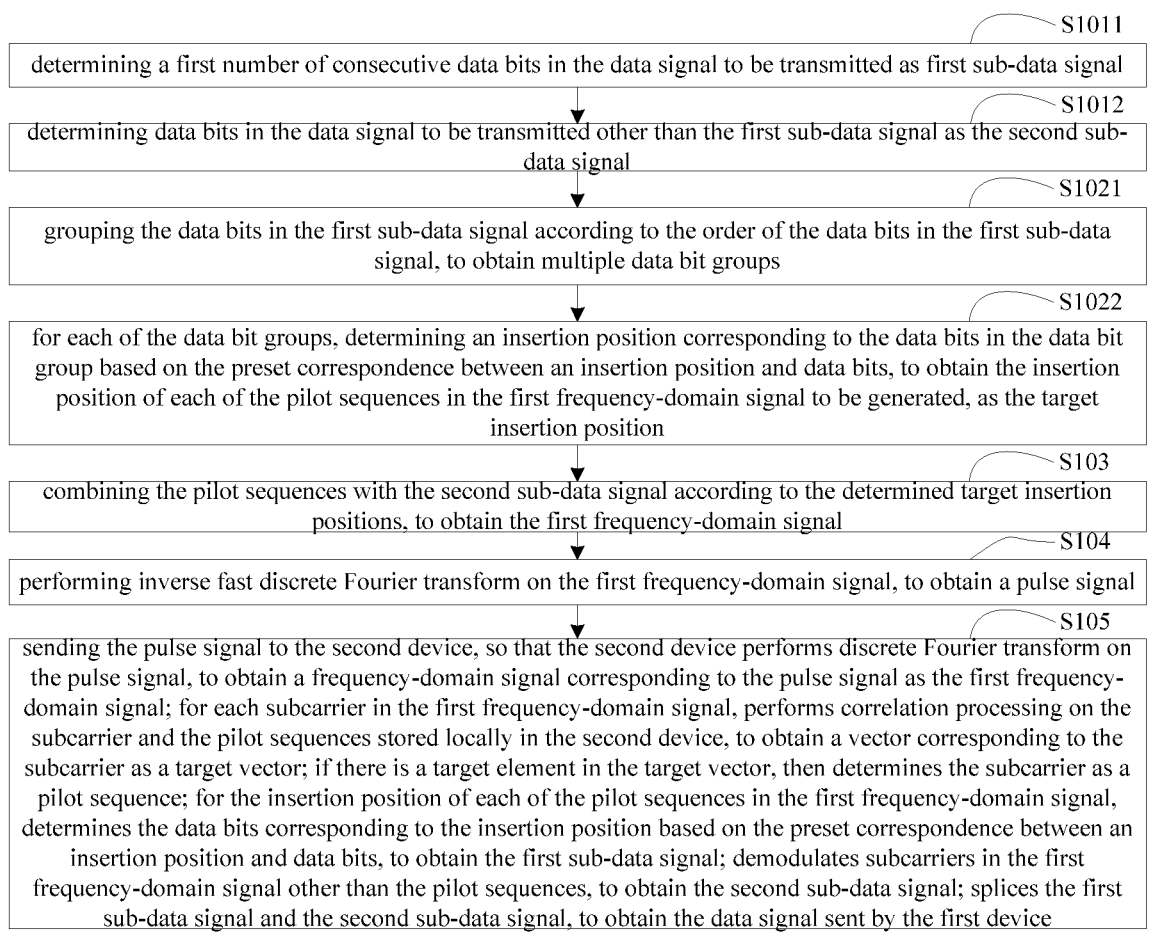
FIG. 3 is a flowchart of another signal processing method provided by an embodiment of the present invention.

In an embodiment of the present invention, referring to FIG. 3, step S102 can include the following steps:

S1021: grouping the data bits in the first sub-data signal according to the order of the data bits in the first sub-data signal, to obtain multiple data bit groups. Wherein, the number of data bits in each of the data bit groups is a preset multiple.

S1022: for each of the data bit groups, determining an insertion position corresponding to the data bits in the data bit group based on the preset correspondence between an insertion position and data bits, to obtain the insertion position of each of the pilot sequences in the first frequency-domain signal to be generated, as the target insertion position.

In an implementation, after grouping the first sub-data signal to obtain a plurality of data bit groups (which can be referred to as the first groups), for the first one of the first groups, the first device can determine the insertion position corresponding to the data bits in the first one of the first groups based on a preset correspondence between an insertion position and data bits. Then, among the first second number of subcarriers in the first frequency-domain signal, the position of the subcarrier corresponding to the insertion position can be determined as the target insertion position. Then for the second one of the first groups, the first device can determine the insertion position corresponding to the data bits in the second one of the first groups based on a preset correspondence between an insertion position and data bits, and in turn, determine the position of the subcarrier corresponding to the insertion position as the target insertion position in the second number subcarriers after the first second number of subcarriers, and so on, until the insertion position corresponding to the data bits in each first group is determined, thus the respective insertion positions of the frequency sequences in the first frequency-domain signal to be generated can be obtained (that is, the respective target insertion positions).

Wherein, the second number is the quotient of the number of subcarriers in the first frequency-domain signal divided by the number of pilot sequences. The number of subcarriers in the first frequency-domain signal can be determined by a technician according to the bandwidth available for the first device to send the pulse signal. For example, the bandwidth available for the first device to send the pulse signal is 120 KHz to 1.4 MHz, and the bandwidth occupied by one subcarrier is 15 KHz, so the number of subcarriers in the first frequency-domain signal is 8 at least and 72 at most.

In another implementation, the first device can further divide the subcarriers contained in the first frequency-domain signal, to obtain multiple subcarrier groups, and the number of subcarrier groups is the same as the number of pilot sequences. The subcarrier groups are in one-to-one correspondence with the first groups, and the position of one subcarrier group among respective subcarrier groups is consistent with the position of the corresponding first group among respective first groups. The order of the subcarrier groups is the order of the subcarrier groups in the first frequency-domain signal, and the order of the first groups is the order of the first groups in the first sub-data signal. The number of subcarriers in each subcarrier group is the same, and the position of only one subcarrier in each subcarrier group is the target insertion position of the pilot sequence. Then, for each first group, the first device can determine the insertion position corresponding to the data bits in the first group based on a preset correspondence between an insertion position and data bits, and then can determine the position of the subcarrier corresponding to the insertion position among the subcarrier groups corresponding to the first group as the target insertion position.

For example, the number of subcarriers in the first frequency-domain signal is 16, the number of pilot sequences is 4, the first sub-data signal is: 01010010, the preset multiple is 2, and the first group obtained by the first device performing grouping on the first sub-data signal includes: 01, 01, 00, 10. The first device can divide the subcarriers included in the first frequency-domain signal into 4 subcarrier groups, and each subcarrier group includes 4 subcarriers. Then, the first device can determine the followings. The insertion position corresponding to 01 in the first one of the first groups is 1; that is, the first device can set the second subcarrier in the first subcarrier group as a pilot sequence. The insertion position corresponding to 01 in the second one of the first groups is 1; that is, the first device can set the second subcarrier in the second subcarrier group as a pilot sequence. The insertion position corresponding to 00 in the third one of the first groups is 0; that is, the first device can set the first subcarrier in the third subcarrier group as a pilot sequence. The insertion position corresponding to 10 in the fourth one of the first groups is 2; that is, the first device can set the third subcarrier in the fourth subcarrier group as a pilot sequence.

In an implementation, the first device can set a subcarrier at the target insertion position in the first frequency-domain signal as a pilot sequence. Then, the first device can also group the second sub-data signal according to the order of the data bits in the second sub-data signal, using a third number of data bits as a group, to obtain multiple data bit groups (which can be referred to as the second group). Wherein, the third number is the number of data bits included in one pilot sequence. Then, the first device can set subcarriers in the first frequency-domain signal other than the target insertion positions as data bits in the second group according to the order of the second groups in the second sub-data signal, to obtain the first frequency-domain signal.

Then, the first device can perform inverse fast discrete Fourier transform on the first frequency-domain signal, to obtain a pulse signal. Furthermore, the first device can send the generated pulse signal to the second device according to a preset pulse repetition interval. Wherein, the pulse signal can be expressed as:

$$s(t) = \sum_{u=0}^{U-1} \sum_{m=0}^{M-1} \sum_{L=0}^{N-1} A[L, m, u]e^{j2\pi\frac{1}{T}(t-uT_{PRI})} \times x(t - mT_s - uT_{PRI}) \quad (1)$$

s(t) represents the pulse signal, L represents the sequence numbers of subcarriers in one pulse signal, m represents the sequence numbers of OFDM symbols in one pulse signal, u represents the sequence numbers of pulse signals sent in a historical time period; A[L, m, u] represents the first frequency-domain signal corresponding to one pulse signal, M represents the number of OFDM symbols in one pulse signal, U represents the number of pulse signals, N represents the number of subcarriers in one pulse signal, and T represents the duration of one OFDM symbol without a cyclic prefix added, $T_s$ represents the duration of one OFDM symbol with a cyclic prefix added, $T_{PRI}$ represents the pulse repetition interval when the first device sends a pulse signal, and x( ) represents a pulse shaping function.

The first device can modulate the pulse signal onto a high-frequency carrier with a frequency $f_c$, to obtain a target signal, and send the target signal to the second device, wherein the target signal can be expressed as:

$$s(t)'=\text{Re}\{s(t)e^{j2\pi f_c}\} \quad (2)$$

s(t)' represents the target signal, $\text{Re}\{s(t)e^{j2\pi f_c}\}$ represents the taking of the real part of $s(t)e^{j2\pi f_c}$, s(t) represents the pulse signal, e represents a natural constant, j represents the unit of an imaginary part, and $f_c$ represents the frequency of the high-frequency carrier.

Correspondingly, after receiving the pulse signal, the second device can process the pulse signal, to obtain the data signal sent by the first device. For the specific processing manner of the second device, reference can be made to related introductions in subsequent embodiments.

In an embodiment of the present invention, the signal processing system can be an Internet of Vehicles system, then the first device is any vehicle in the Internet of Vehicles system, and the second device is a vehicle that receives a pulse signal sent by the first device. Furthermore, the first device can also determine the distance between the first device and the second device (which can be called a target distance), and the current moving speed of the second device relative to the first device (which can be called a target speed).

Figure 4:
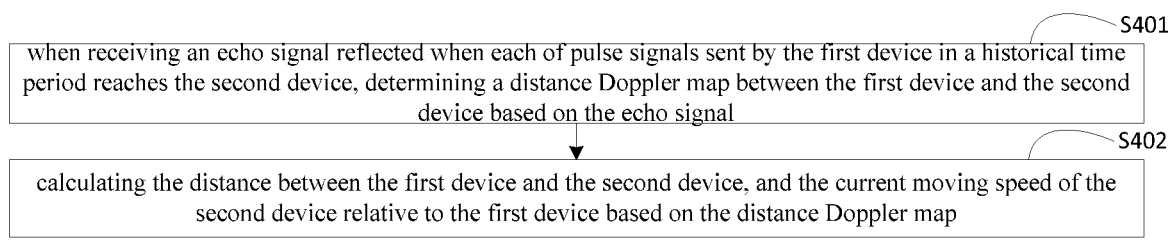
FIG. 4 is a flowchart of a method for determining a target distance and a target speed provided by an embodiment of the present invention.

Correspondingly, referring to FIG. 4, FIG. 4 is a flowchart of a method for determining a target distance and a target speed according to an embodiment of the present invention. The method can include the following steps:

S401: when receiving an echo signal reflected when each of pulse signals sent by the first device in a historical time period reaches the second device, determining a distance Doppler map between the first device and the second device based on the echo signal.

S402: calculating the distance between the first device and the second device, and the current moving speed of the second device relative to the first device based on the distance Doppler map.

Regarding step S401 and step S402, in an implementation, within the historical time period, the first device can send multiple pulse signals to the second device at a preset pulse repetition interval. Each of pulse signals will be reflected when it reaches the second device, and the reflected pulse signals will be superimposed when they reach the first device, and the superimposed pulse signals are the echo signal in the embodiment of the present invention.

The historical time period is one coherent processing time, which is the duration of one OFDM frame signal, and the duration of one OFDM frame signal is 10 ms. Furthermore, the first device can determine the distance Doppler map between the first device and the second device according to the echo signal, and calculate the distance between the first device and the second device (that is, the target distance), and the current moving speed of the second device relative to the first device (that is, the target speed) based on the distance Doppler map.

In an embodiment of the present invention, the echo signal can be expressed as:

$$r(t) = \sum_{g=1}^{G} \rho_g s\left(t - \frac{2(R_g - v_g t)}{c}\right) e^{-j\pi f_c \frac{4(R_g - v_g t)}{c}} + \omega(t) \quad (3)$$

r(t) represents the echo signal, G represents the total number of second devices, c represents the speed of light, $\rho_g$ represents the attenuation coefficient of the pulse signal when transmitted between the first device and the g-th second device, $f_c$ represents the frequency of the high-frequency carrier through which a pulse signal is sent by the first device, $R_g$ represents the distance between the first device and the g-th second device, $v_g$ represents the current moving speed of the g-th second device relative to the first device, e Represents a natural constant, j represents the unit of an imaginary number, $\omega(t)$ represents Gaussian white noise;

$$s\left(t - \frac{2(R_g - v_g t)}{c}\right)$$

represents a pulse signal reflected when each of pulse signals reaches the g-th second device; t represents the moment when the first device sends the first pulse signal in the pulse signals;

$$\frac{2(R_g - v_g t)}{c}$$

represents the time period from when the first device sends the first pulse to when the first device receives the echo signal.

Correspondingly, step S401 can include the following steps:

Step 1: when receiving the echo signal reflected when each of pulse signals sent by the first device in the historical time period reaches the second device, sampling the echo signal according to a preset sampling interval, to obtain a sample signal, and performing discrete Fourier transform on the sample signal, to obtain a frequency-domain signal corresponding to the pulse signals as a second frequency-domain signal. Wherein, the second frequency-domain signal is:

$$r[L, m, u] = \sum_{g=0}^{G} \rho_g \sum_{L=0}^{N-1} A[L, m, u] e^{j2\pi \Delta f L T/N} \times e^{-j4\pi L \Delta f R_g/c} \times e^{j4\pi L \Delta f (m T_s + u T_{PRI}) v_g/c} \times e^{j4\pi L \Delta f (L T/N) v_g/c} \quad (4)$$

wherein, $$\Delta f = \frac{1}{T},$$

r[L, m, u] represents the second frequency-domain signal, N represents the number of subcarriers in one pulse signal, L represents the sequence numbers of subcarriers in one pulse signal, and the sequence number of one subcarrier indicates the position of the subcarrier in the pulse signal, m represents the sequence numbers of OFDM symbols in one pulse signal, the sequence number of one OFDM symbol represents the position of the OFDM symbol in the pulse signal, u represents the sequence numbers of the pulse signals sent in the historical time period, the sequence number of one pulse signal indicates the order in which the first device sends the pulse signal; A[L, m, u] represents the first frequency-domain signal corresponding to one pulse signal; T represents the duration of one OFDM symbol without a cyclic prefix added, $T_s$ represents the duration of one OFDM symbol with a cyclic prefix added, $T_{PRI}$ represents a pulse repetition interval when the first device sends pulse signals;

Step 2: performing discrete Fourier transform on the second frequency-domain signal, to obtain a third frequency-domain signal corresponding to the pulse signals. Wherein, the third frequency-domain signal is:

$$P[L, m, u] = \sum_{g=1}^{G} p_g A[L, m, u] e^{j4\pi L \Delta f \frac{R_g}{c}} \times e^{j4\pi L \Delta f (mT_S + uT_{PRI}) \frac{v_g}{c}} \quad (5)$$

$P[L, m, u]$ represents the third frequency-domain signal.

Step 3: determining pilot sequences in the third frequency-domain signal as pilot signals.

Step 4: performing matched filtering on the pilot frequency-domain signals, to obtain a fourth frequency-domain signal corresponding to the pulse signals. Wherein, the fourth frequency-domain signal is:

$$E[L, k, u] = \sum_{g=1}^{G} \rho_g e^{j4\pi i \Delta f (mT_S + uT_{PRI}) \frac{v_g}{c}} e^{j4\pi i \Delta f \frac{R_g}{c}} \prod [L, k] \quad (6)$$

$E[L, k, u]$ represents the fourth frequency-domain signal, $\pi[L, k]$ represents pilot sequences in one pulse signal after matched filtering; i represents the target insertion position of each of the pilot sequences in one pulse signal; k represents the sequence numbers of column vectors representing the third frequency-domain signal after matched filtering, and the sequence number of one column vector represents the position of the column vector in the third frequency-domain signal.

Step 5: dividing the fourth frequency-domain signal, to obtain multiple matrices to be processed. Wherein, the multiple matrices to be processed correspond to the pulse signals one by one.

Step 6: for each of the matrices to be processed, determining the largest element in each row vector in the matrix to be processed as a first element.

Step 7: using the determined first elements in each of the matrices to be processed as a column vector, to obtain the target matrix.

Step 8: performing inverse Fast Fourier transform on the row vectors and column vectors of the target matrix respectively, to obtain the distance Doppler map between the first device and the second device. Wherein, the distance Doppler map is:

$$E[r, v] = \sum_{r=0}^{N_1 - 1} \sum_{v=0}^{U-1} E[L, u] e^{j2\pi L r / N_1} \times e^{j2\pi u v / U} \quad (7)$$

$E[r, v]$ represents the distance Doppler map, U represents the number of the pulse signals, $N_1$ represents the number of pilot sequences in one pulse signal, $E[L, u]$ represents the target matrix; r represents the sequence numbers of row vectors in the distance Doppler map, the sequence number of one row vector indicates the position of the row vector in the distance Doppler map, v represents the sequence numbers of column vectors in the distance Doppler map, and the sequence number of one column vector indicates the position of the column vector in the distance Doppler map.

In an implementation, when receiving an echo signal, the first device can sample the received echo signal according to a preset sampling interval, to obtain a sample signal. The preset sampling interval can be: $uT_{PRI} + mT_s + bT$, wherein b is a positive integer, for example, b can be 0, or 1, or 2, to which is not limited.

Then, the first device can perform discrete Fourier transform on the sample signal, to obtain the second frequency-domain signal as shown in Formula (4). The first device can also perform discrete Fourier transform on the second frequency-domain signal, to obtain the third frequency-domain signal as shown in Formula (5). The first device can also determine pilot sequences in the third frequency-domain signal, and extract the determined pilot sequences from the third frequency-domain signal, to obtain a pilot signal. The manner in which the first device determines the pilot sequence in the third frequency-domain signal is similar to the manner in which the second device determines the pilot sequence in the first frequency-domain signal, and reference can be made to related introductions in subsequent embodiments.

Since the echo signal received by the first device is obtained by superimposing respective reflected pulse signals, that is to say, the echo signal includes respective reflected pulse signals. Correspondingly, the third frequency-domain signal determined based on the echo signal includes frequency-domain signals (can be referred to as sub-frequency-domain signals) corresponding to respective pulse signals.

Therefore, the pilot sequence in the third frequency-domain signal is also the pilot sequence in each of pulse signals, that is, the pilot signal includes the pilot sequence in each of pulse signals. Therefore, the fourth frequency-domain signal obtained by performing matched filtering on the pilot signals includes the pilot sequence in each of pulse signals after the matched filtering.

Furthermore, the first device can divide the fourth frequency-domain signal, that is, determine the pilot sequence (i.e., the matrix to be processed) in each of pulse signals after matched filtering from the fourth frequency-domain signal. In an implementation, the first device can determine the number (that is, $N_1$) of pilot sequences in each of pulse signals, and then, the first device can divide the fourth frequency-domain signal by using $N_1$ row vectors as a matrix to be processed, to obtain multiple matrices to be processed. Furthermore, for each of the matrices to be processed, the first device can determine the largest element in each row vector in the matrix to be processed as a first element, and use the determined first elements in each of the matrices to be processed as a column vector, to obtain the target matrix.

For example, the echo signal received by the first device is obtained by superimposing five reflected pulse signals, the third frequency-domain signal includes frequency-domain sub-signals corresponding to the five pulse signals, and the pilot signal includes the pilot sequences in the five pulse signals, one pulse signal contains 3 pilot sequences, and the first device can divide the fourth frequency-domain signal into 5 matrices to be processed by using every 3 row vectors as a matrix to be processed.

For each of the matrices to be processed, the largest element (that is, the first element) in each row vector of the matrix to be processed is determined, to obtain 3 elements, and the 3 elements are used as a column vector of the target matrix. Furthermore, a target matrix including the first element in each of the matrices to be processed can be obtained, and the dimension of the target matrix is 3*5.

The first device can also perform inverse fast Fourier transform on the row vectors and the column vectors of the target matrix, respectively, to obtain the distance Doppler map between the first device and the second device as shown in Formula (7).

In an embodiment of the present invention, step S402 can include the following steps:

Step 1: determining the sequence number of a row in the distance Doppler map where an element that is greater than a preset threshold is located, as a first value, and the sequence number of a column in the distance Doppler map where the element that is greater than the preset threshold is located, as a second value.

Step 2: determining the distance between the first device and the second device based on the first value and a first preset formula. Wherein, the first preset formula is:

$$R_g = \frac{x_g c}{2N\frac{1}{T}} \quad (8)$$

$R_g$ represents the distance between the first device and the g-th second device, c represents the speed of light, N represents the number of subcarriers in one pulse signal, and $x_g$ represents a first value corresponding to the g-th element that is greater than the preset threshold in the distance Doppler map; T represents the duration of one OFDM symbol without a cyclic prefix added;

Step 3: determining the current moving speed of the second device relative to the first device based on the second value and a second preset formula. Wherein, the second preset formula is:

$$v_g = \frac{\left(\frac{U}{2} - y_g\right)c}{2UT_{PRI}f_c} \quad (9)$$

$V_g$ represents the current moving speed of the g-th second device relative to the first device, U represents the number of pulse signals sent in the historical time period, c represents the speed of light, and $y_g$ represents a second value corresponding to the g-th element that is greater than the preset threshold in the distance Doppler map; $T_{PRI}$ represents a pulse repetition interval when the first device sends pulse signals; $f_c$ represents the frequency of the high-frequency carrier through which each of pulse signals is sent by the first device.

In an implementation, the first device can perform inverse fast discrete Fourier transform on each row vector of the distance Doppler matrix, to obtain the following Formula (10):

$$\gamma(x_g) = \sum_{L=0}^{N_1-1} e^{-j4\pi i \Delta f \frac{R_g}{c}} \times e^{\frac{j2\pi L x_g}{N_1}} \quad (10)$$

$\gamma(x_g)$ represents the g-th target element, $N_1$ represents the number of pilot sequences in one pulse signal, $R_g$ represents the distance between the first device and the g-th second device, c represents the speed of light, $x_g$ represents a second value of the g-th target element, and L represents the sequence numbers of subcarriers in one pulse signal.

When $$-j4\pi i \Delta f \frac{R_g}{c} + \frac{j2\pi L x_g}{N_1} = 0$$

is established in the above Formula (10), the target distance calculation formula shown in the above Formula (8) can be obtained based on the above Formula (10). Furthermore, the first device can determine the distance between the first device and the second device based on the above Formula (8).

The first device can also perform inverse fast discrete Fourier transform on each column vector of the distance Doppler matrix, to obtain the following Formula (10):

$$\gamma(y_g) = \sum_{u=0}^{U-1} e^{j4\pi u T_{PRI} f_c \frac{v_g}{c}} e^{j2\pi v_g \frac{u}{U}} \quad (11)$$

$\gamma(y_g)$ represents the g-th target element, U represents the number of pulse signals, $v_g$ represents the current moving speed of the g-th second device relative to the first device, c represents the speed of light, and $y_g$ represents a third value of the g-th target element; u represents the sequence numbers of pulse signals, $T_{PRI}$ represents a pulse repetition interval when the first device sends pulse signals; $f_c$ represents the frequency of the high-frequency carrier through which each of pulse signals is sent by the first device, c represents the speed of light.

When $$j4\pi u T_{PRI} f_c \frac{v_g}{c} + j2\pi v_g \frac{u}{U} = 0$$

is established in the above Formula (11), the target speed calculation formula shown in the above Formula (9) can be obtained based on the above Formula (11). Furthermore, the first device can determine the current moving speed of the second device relative to the first device based on the above Formula (9).

Additionally, the accuracy with which the first device can determine the target distance can be expressed as:

$$\Delta R = \frac{c}{2B} \quad (12)$$

$\Delta R$ represents the accuracy of the target distance, B represents the bandwidth that the first device can use to send the pulse signal, and c represents the speed of light.

The accuracy of the target distance is related to the bandwidth that the first device can use to send the pulse signal. Therefore, it can be obtained that the maximum distance (which can be called the first maximum distance) that can be determined by the first device under the condition of the highest accuracy can be expressed as:

$$R_{max}^1 = \frac{N_1 c}{2B} \quad (13)$$

$R_{max}^1$ represents the first maximum distance, and $N_1$ represents the number of pilot sequences in one pulse signal.

In the signal processing method provided by the embodiment of the present invention, the number of pilot sequences can be set to be greater than 2, which can increase the first maximum distance while improving spectrum resource utilization.

The accuracy of the target velocity that the first device can determine can be expressed as:

$$\Delta v = \frac{c}{2UT_{PRI}f_c} \quad (14)$$

$\Delta v$ represents the accuracy of the target speed, c represents the speed of light, u represent the number of pulse signals, $T_{PRI}$ represents the pulse repetition interval when the first device sends pulse signals; $f_c$ represents the frequency of the high-frequency carrier through which each of pulse signals is sent by the first device.

When the frequency $f_c$ of the high-frequency carrier through which each of pulse signals is sent by the first device is constant, the accuracy of the target speed is related to the pulse repetition interval bandwidth when each of pulse signals is sent by the first device, therefore, the maximum speed that can be determined by the first device can be expressed as:

$$v_{max} = \pm \frac{c}{4T_{PRI}f_c} \quad (15)$$

$v_{max}$ represents the maximum speed that can be determined by the first device.

The spectrum resource utilization rate (which can be referred to as the first utilization rate) based on the signal processing method provided by the embodiment of the present invention can be expressed as:

$$\eta = \eta_0 + \Delta\eta = (1-\alpha)\log_2 m + \frac{\alpha\log_2\alpha}{M} \quad (16)$$

$\eta$ represents the first utilization rate, $\eta_0$ represents the spectrum resource utilization rate based on the prior art (which can be referred to as the second utilization rate), $\Delta\eta$ represents the difference between the first utilization rate and the second utilization rate, and $\alpha$ represents the ratio of the number of pilot sequences in one pulse signal to the number of all subcarriers contained in the pulse signal, m represents the sequence numbers of OFDM symbols in one pulse signal, and M represents the number of OFDM symbols in one pulse signal.

In a communication system based on integrated radar and communication technology, part of subcarriers in a pulse signal is set as a pilot sequence, and the other part is set as a data signal. The first maximum distance is positively correlated with the number of pilot sequences, so the increase in the number of pilot sequences can increase the first maximum distance of the first device, but will reduce the transmitted data signal and the transmission rate of the data signal. Therefore, the data transmission rate (which can be referred to as the first transmission rate) based on the signal processing method provided by the embodiment of the present invention can be expressed as:

$$\delta_1 = \frac{N_1[\log_2\alpha] + N_2 M\log_2 m}{M(1+\beta)\left(\frac{N}{B}\right) + T_{off}} \quad (17)$$

The data transmission rate based on the prior art (which can be referred to as the second transmission rate) can be expressed as:

$$\delta_0 = \frac{N_2 M\log_2 m}{M(1+\beta)\left(\frac{N}{B}\right) + T_{off}} \quad (18)$$

$$T_{off} = T_{PRI} - MT_s \quad (19)$$

$\delta_1$ represents the first transmission rate, $N_1$ represents the number of pilot sequences in one pulse signal, $N_2$ represents the number of subcarriers set as data signals in one pulse signal, and $\alpha$ represents the ratio of the number of pilot sequences in one pulse signal to the number of all subcarriers contained in the pulse signal, M represents the number of OFDM symbols in one pulse signal, m represents the sequence numbers of OFDM symbols in one pulse signal, $\beta$ represents the ratio occupied by the cyclic prefix in one OFDM symbol, N represents the number of all subcarriers contained in one pulse signal, B represents the bandwidth that the first device can use to send the pulse signal, $T_{PRI}$ represents a pulse repetition interval when the first device sends pulse signals, $T_s$ represents the duration of one OFDM symbol with a cyclic prefix added and $\delta_0$ represents the second transmission rate.

Since the first maximum distance and the first transmission rate relate to the bandwidth B that the first device can use to send the pulse signal, the relationship expression between the first maximum distance and the first transmission rate based on the signal processing method provided by the embodiment of the present application can be obtained as:

$$\delta_1 = \frac{N_1 c[\log_2\alpha] + N_2 cM\log_2 m}{2(1+\beta)M\alpha R_{max}^1 + cT_{off}} \quad (20)$$

In the prior art, the relationship expression between the maximum distance (the second maximum distance) that can be determined by the first device and the second transmission rate is:

$$\delta_0 = \frac{N_2 cM\log_2 m}{2(1+\beta)M\alpha R_{max}^2 + cT_{off}} \quad (21)$$

$N_1$ represents the number of pilot sequences in one pulse signal, $\alpha$ represents the ratio of the number of pilot sequences in one pulse signal to the number of all subcarriers contained in the pulse signal, $R_{max}^1$ represents the first maximum distance, $R_{max}^2$ means the second largest distance, and c represents the speed of light.

Comparing the above Formula (20) and Formula (21), it can be obtained that when the bandwidth that the first device can use to send the pulse signal is the same, compared with the prior art, the signal processing method based on the embodiment of the present application can transmit more data signals, can increase the transmission rate of the data signal. When the transmission rates of the data signals are the same, the first maximum distance is greater than the second maximum distance.

Figure 5:
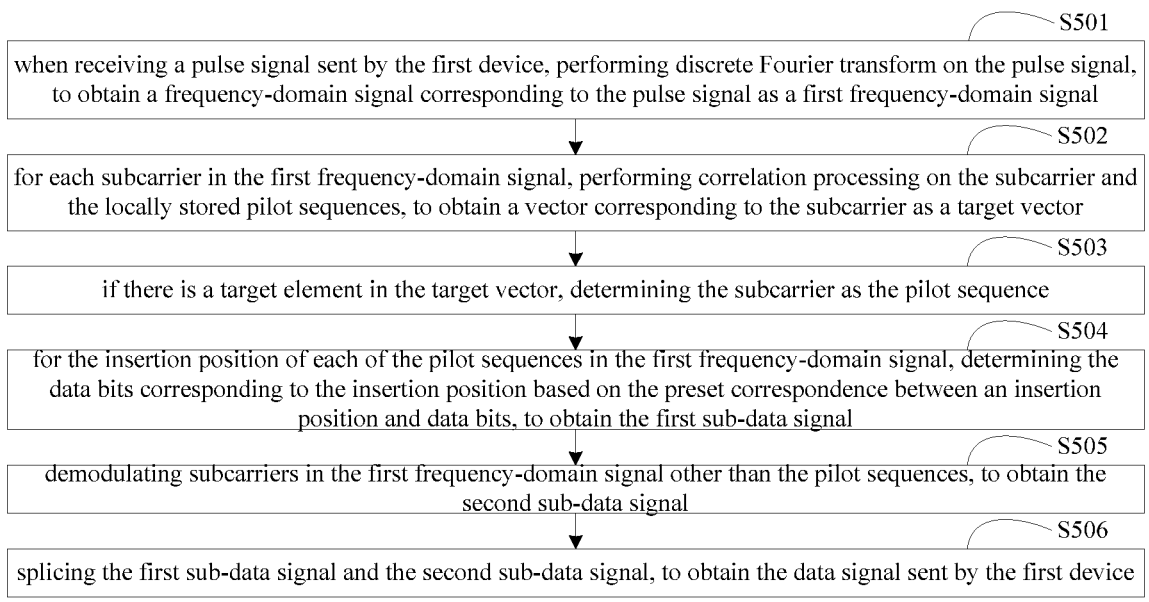
FIG. 5 is a flowchart of another signal processing method provided by an embodiment of the present invention.

Referring to FIG. 5, FIG. 5 is a flowchart of another signal processing method provided by an embodiment of the present application. The method can be applied to the second device in the above-mentioned signal processing system. The signal processing system also includes the first device. The method can include the following steps:

S501: when receiving a pulse signal sent by the first device, performing discrete Fourier transform on the pulse signal, to obtain a frequency-domain signal corresponding to the pulse signal as a first frequency-domain signal.

Wherein, the pulse signal is obtained by the first device performing inverse fast discrete Fourier transform on the first frequency-domain signal; the first frequency-domain signal is obtained by the first device as follows: dividing the data bits in the data signal to be transmitted based on the number of multiple preset pilot sequences, to obtain the first sub-data signal and the second sub-data signal, and determining an insertion position of each of the pilot sequences in a first frequency-domain signal to be generated, as a target insertion position based on data bits in the first sub-data signal and the preset correspondence between an insertion position and data bits; combining the pilot sequences with the second sub-data signal according to the determined target insertion positions; wherein, the second sub-data signal is located at insertion positions in the first frequency-domain signal other than the target insertion positions.

S502: for each subcarrier in the first frequency-domain signal, performing correlation processing on the subcarrier and the locally stored pilot sequences, to obtain a vector corresponding to the subcarrier as a target vector.

S503: if there is a target element in the target vector, determining the subcarrier as the pilot sequence. Wherein the target element is greater than an element adjacent to the target element.

S504: for the insertion position of each of the pilot sequences in the first frequency-domain signal, determining the data bits corresponding to the insertion position based on the preset correspondence between an insertion position and data bits, to obtain the first sub-data signal.

S505: demodulating subcarriers in the first frequency-domain signal other than the pilot sequences, to obtain the second sub-data signal.

S506: splicing the first sub-data signal and the second sub-data signal, to obtain the data signal sent by the first device.

Based on the signal processing method provided by the embodiment of the present invention, although some subcarriers in the first frequency-domain signal also need to be set as pilot sequences, the second device can determine the data signal to be transmitted based on the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved.

In step 501, the first device can generate a pulse signal including a pilot sequence and a data signal, and send the pulse signal to the second device. For a specific processing manner of the first device, reference can be made to relevant introductions of the foregoing embodiments. Correspondingly, when receiving the pulse signal, the second device can perform discrete Fourier transform on the received pulse signal, to obtain the frequency-domain signal corresponding to the pulse signal as the first frequency-domain signal For steps S502 and S503, for each subcarrier in the first frequency-domain signal, the second device can perform correlation processing on the subcarrier and the pilot sequences stored locally, to obtain a vector corresponding to the subcarrier as a target vector. If there is a target element that is greater than an element adjacent to the target element in the target vector, then the subcarrier is determined as the pilot sequence.

In an embodiment of the present invention, step S504 can include the following steps:

Step 1: for the insertion position of each of the pilot sequences in the first frequency-domain signal, determining the data bits corresponding to the insertion position based on the preset correspondence between an insertion position and data bits.

Step 2: splicing the data bits corresponding to each insertion position according to the order of the insertion positions in the first frequency-domain signal, to obtain the first sub-data signal.

It can be understood that, in order for the second device to obtain the data signal sent by the first device, the preset correspondence between an insertion position and data bits stored in the second device is the same as the preset correspondence between an insertion position and data bits stored in the first device.

For example, the pilot sequences is the first carrier, the second carrier and the fourth subcarrier in the first frequency-domain signal, and the insertion positions of the pilot sequences are 0, 1 and 3. The data bits corresponding to insertion position 0 are 00, the data bits corresponding to insertion position 1 are 01, and the data bits corresponding to insertion position 3 are 10, then the second device can determine that the first sub-data signal is: 000110.

For step S505 and step S506, the second device can determine subcarriers (which can be referred to as data carriers) in the first frequency-domain signal other than the pilot sequences, and then, the second device can demodulate the data subcarriers, to obtain the second sub-data signal. Further, the second device can splice the first sub-data signal and the second sub-data signal, to obtain the data signal sent by the first device.

Figure 6:
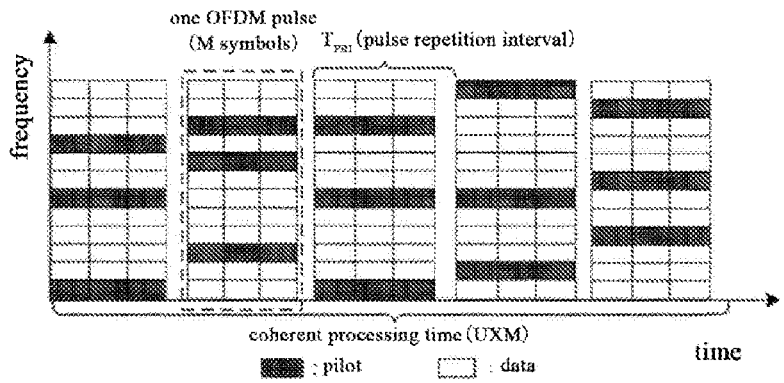
FIG. 6 is a schematic view of a pulse signal provided by an embodiment of the present invention.

Referring to FIG. 6, FIG. 6 is a schematic view of one pulse signal provided by an embodiment of the present invention. FIG. 6 shows one OFDM frame signal, that is, U (U is 5 in FIG. 6) pulse signals sent within one coherent processing time. Wherein, the part indicated by the dotted line box is one OFDM pulse (that is, one pulse signal). Each of pulse signals includes M (M is 3 in FIG. 6) OFDM symbols and N (N is 12 in FIG. 6) subcarriers. The subcarriers shown in black part in each of pulse signals are subcarriers set as pilot sequences, and the subcarriers other than the black part are subcarriers set as data signals. The first device sends each of pulse signals according to a preset pulse repetition interval (i.e., $T_{PRI}$).

In FIG. 6, each of pulse signals contains 3 pilot sequences, and the 12 subcarriers contained in the pulse signal are divided into 3 subcarrier groups, each subcarrier group contains 4 subcarriers, and each subcarrier group contains one pilot sequence. According to the preset correspondence between an insertion position and data bits, data bits 00 correspond to the first subcarrier, data bits 01 correspond to the second subcarrier, data bits 10 correspond to the third subcarrier, and data bits 11 correspond to the fourth subcarrier carrier. Therefore, the data signal represented by the insertion positions of the pilot sequences in each of pulse signals shown in FIG. 6 is: 11101110000110101100101010010100.

Figure 7:
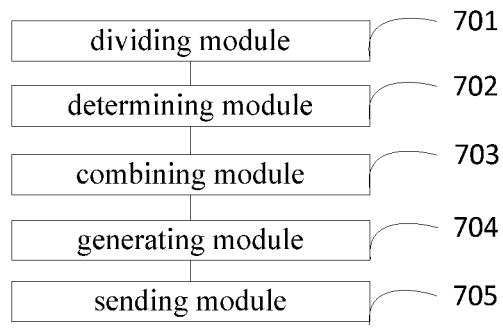
FIG. 7 is a structural view of a signal processing apparatus provided by an embodiment of the present invention.

Corresponding to the method embodiment in FIG. 1, referring to FIG. 7, FIG. 7 is a structural view of a signal processing apparatus provided by an embodiment of the present invention. The apparatus is applied to a first device in a signal processing system that further includes a second device. The apparatus comprises: a dividing module 701, configured for dividing data bits in a data signal to be transmitted based on the number of multiple preset pilot sequences, to obtain a first sub-data signal and a second sub-data signal; a determining module 702, configured for determining, as a target insertion position, an insertion position of each of the pilot sequences in a first frequency-domain signal to be generated based on data bits in the first sub-data signal, and a preset correspondence between an insertion position and data bits; a combining module 703, configured for combining the pilot sequences with the second sub-data signal according to the determined target insertion positions, to obtain the first frequency-domain signal; wherein, the second sub-data signal is located at insertion positions in the first frequency-domain signal other than the target insertion positions; a generating module 704, configured for performing inverse fast discrete Fourier transform on the first frequency-domain signal, to obtain a pulse signal; a sending module 705, configured for sending the pulse signal to the second device, so that the second device performs discrete Fourier transform on the received pulse signal, to obtain a frequency-domain signal corresponding to the pulse signal as the first frequency-domain signal; for each subcarrier in the first frequency-domain signal, performs correlation processing on the subcarrier and the pilot sequences stored locally in the second device, to obtain a vector corresponding to the subcarrier as a target vector; if there is a target element in the target vector, then determines the subcarrier as a pilot sequence; for the insertion position of each of the pilot sequences in the first frequency-domain signal, determines data bits corresponding to the insertion position based on the preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device; wherein, the target element is greater than an element adjacent to the target element.

Optionally, the dividing module 701 is specifically configured determining a first number of consecutive data bits in the data signal to be transmitted as the first sub-data signal, wherein, the first sub-data signal is frontmost first number of data bits in the data signal to be transmitted, or the first sub-data signal is rearmost first number of data bits in the data signal to be transmitted; the first number is a preset multiple of the number of the pilot sequences; determining data bits in the data signal to be transmitted other than the first sub-data signal as the second sub-data signal.

Optionally, the determining module 702 is specifically configured grouping the data bits in the first sub-data signal according to an order of the data bits in the first sub-data signal, to obtain multiple data bit groups; wherein, the number of data bits in each of the data bit groups is the preset multiple; for each of the data bit groups, determining an insertion position corresponding to the data bits in the data bit group based on the preset correspondence between an insertion position and data bits, to obtain the insertion position of each of the pilot sequences in the first frequency-domain signal to be generated, as the target insertion position.

Optionally, the apparatus further comprises: a processing module, configured for: when receiving an echo signal reflected when each of pulse signals sent by the first device in a historical time period reaches the second device, determining a distance Doppler map between the first device and the second device based on the echo signal; calculating a distance between the first device and the second device, and a current moving speed of the second device relative to the first device based on the distance Doppler map.

Optionally, the echo signal is:

$$r(t) = \sum_{g=1}^{G} \rho_g s\left(t - \frac{2(R_g - v_g t)}{c}\right) e^{-j\pi f_c \frac{4(R_g - v_g t)}{c}} + \omega(t),$$

r(t) represents the echo signal, G represents the total number of second devices, c represents a speed of light, $\rho_g$ represents an attenuation coefficient of a pulse signal when transmitted between the first device and a g-th second device, $f_c$ represents a frequency of a high-frequency carrier through which a pulse signal is sent by the first device, $R_g$ represents a distance between the first device and the g-th second device, $v_g$ represents a current moving speed of the g-th second device relative to the first device, e represents a natural constant, j represents a unit of an imaginary number, ω(t) represents Gaussian white noise;

$$s\left(t - \frac{2(R_g - v_g t)}{c}\right)$$

represents a pulse signal reflected when each of pulse signals reaches the g-th second device; t represents a moment when the first device sends a first pulse signal in pulse signals;

$$\frac{2(R_g - v_g t)}{c}$$

represents a time period from when the first device sends the first pulse signal to when the first device receives the echo signal;

the processing module is specifically configured for: when receiving the echo signal reflected when each of pulse signals sent by the first device in the historical time period reaches the second device, sampling the echo signal according to a preset sampling interval, to obtain a sample signal, and performing discrete Fourier transform on the sample signal, to obtain a frequency-domain signal corresponding to the pulse signals as a second frequency-domain signal; wherein, the second frequency-domain signal is:

$$r[L, m, u] = \sum_{g=0}^{G} \rho_g \sum_{L=0}^{N-1} A[L, m, u] e^{j2\pi \Delta f L T/N} \times$$

$$e^{-j4\pi L \Delta f R_g/c} \times e^{j4\pi L \Delta f (mT_s + uT_{PRI})v_g/v} \times e^{j4\pi L \Delta f (LT/N)v_g/c},$$

-continued

Wherein, $\Delta f = \dfrac{1}{T}$, r[L, m, u] represents the second frequency-domain signal, N represents the number of subcarriers in one pulse signal, L represents sequence numbers of subcarriers in one pulse signal, and the sequence number of one subcarrier indicates a position of the subcarrier in the pulse signal, m represents sequence numbers of OFDM symbols in one pulse signal, the sequence number of one OFDM symbol represents a position of the OFDM symbol in the pulse signal, u represents sequence numbers of pulse signals sent in the historical time period, the sequence number of one pulse signal indicates the order in which the first device sends the pulse signal; A[L, m, u] represents a first frequency-domain signal corresponding to one pulse signal; T represents a duration of one OFDM symbol without a cyclic prefix added, $T_s$ represents a duration of one OFDM symbol with a cyclic prefix added, $T_{PRI}$ represents a pulse repetition interval when the first device sends the pulse signals;

performing discrete Fourier transform on the second frequency-domain signal, to obtain a third frequency-domain signal corresponding to the pulse signals; wherein, the third frequency-domain signal is:

$$P[L, m, u] = \sum_{g=1}^{G} \rho_g A[L, m, u] e^{j4\pi L\Delta f \frac{R_g}{c}} \times e^{j4\pi L\Delta f (mT_s + uT_{PRI}) \frac{v_g}{c}},$$

P[L, m, u] represents the third frequency-domain signal;

determining pilot sequences in the third frequency-domain signal as pilot signals;

performing matched filtering on the pilot signals, to obtain a fourth frequency-domain signal corresponding to the pulse signals; wherein, the fourth frequency-domain signal is:

$$E[L, k, u] = \sum_{g=1}^{G} \rho_g e^{j4\pi i\Delta f(mT_s + uT_{PRI}) \frac{v_g}{c}} e^{j4\pi i\Delta f \frac{R_g}{c}} \prod [L, k],$$

E[L, k, u] represents the fourth frequency-domain signal, π[L, k] represents pilot sequences in one pulse signal after matched filtering; i represents the target insertion position of each of the pilot sequences in one pulse signal; k represents sequence numbers of column vectors representing the third frequency-domain signal after matched filtering, and the sequence number of one column vector represents a position of the column vector in the third frequency-domain signal;

dividing the fourth frequency-domain signal, to obtain multiple matrices to be processed; wherein, the multiple matrices to be processed correspond to the pulse signals one by one;

for each of the matrices to be processed, determining a largest element in each row vector in the matrix to be processed as a first element;

using the determined first elements in each of the matrices to be processed as a column vector, to obtain a target matrix;

performing inverse Fast Fourier transform on row vectors and column vectors of the target matrix respectively, to obtain the distance Doppler map between the first device and the second device; wherein, the distance Doppler map is:

$$E[r, v] = \sum_{r=0}^{N_1-1} \sum_{v=0}^{U-1} E[L, u] e^{j2\pi Lr/N_1} \times e^{j2\pi uv/U},$$

E[r, v] represents the distance Doppler map, U represents the number of the pulse signals, $N_1$ represents the number of pilot sequences in one pulse signal, E[L, u] represents the target matrix; r represents sequence numbers of row vectors in the distance Doppler map, the sequence number of one row vector indicates a position of the row vector in the distance Doppler map, v represents sequence numbers of column vectors in the distance Doppler map, and the sequence number of one column vector indicates a position of the column vector in the distance Doppler map.

Optionally, the processing module is specifically configured for determining a sequence number of a row in the distance Doppler map where an element that is greater than a preset threshold is located, as a first value, and a sequence number of a column in the distance Doppler map where the element that is greater than the preset threshold is located, as a second value;

determining the distance between the first device and the second device based on the first value and a first preset formula; wherein, the first preset formula is:

$$R_g = \dfrac{x_g c}{2N\dfrac{1}{T}},$$

$R_g$ represents a distance between the first device and the g-th second device, c represents a speed of light, N represents the number of subcarriers in one pulse signal, and $x_g$ represents a first value corresponding to a g-th element that is greater than the preset threshold in the distance Doppler map; T represents a duration of one OFDM symbol without a cyclic prefix added;

determining the current moving speed of the second device relative to the first device based on the second value and a second preset formula; wherein, the second preset formula is:

$$v_g = \dfrac{\left(\dfrac{U}{2} - y_g\right)c}{2UT_{PRI}f_c},$$

$v_g$ represents a current moving speed of the g-th second device relative to the first device, U represents the number of pulse signals sent in the historical time period, c represents the speed of light, and $y_g$ represents a second value corresponding to the g-th element that is greater than the preset threshold in the distance Doppler map; $T_{PRI}$ represents a pulse repetition interval when the first device sends pulse signals; $f_c$ represents a frequency of a high-frequency carrier through which each of pulse signals is sent by the first device.

Based on the signal processing method provided by the embodiment of the based on the present invention, although some subcarriers in the first frequency-domain signal also need to be set as pilot sequences, the second device can determine the data signal to be transmitted the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved.

Figure 8:
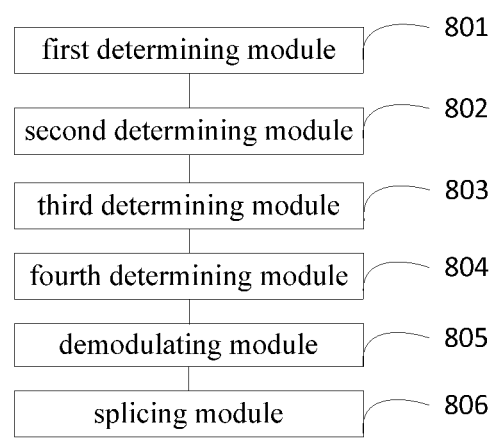
FIG. 8 is a structural view of another signal processing apparatus provided by an embodiment of the present invention.

Corresponding to the method embodiment of FIG. 5, referring to FIG. 8, FIG. 8 is a structural view of another signal processing apparatus provided by an embodiment of the present application. The apparatus is applied to a second device in a signal processing system that further includes a first device. The apparatus comprises: a first determining module 801, configured for: when receiving a pulse signal sent by the first device, performing discrete Fourier transform on the pulse signal, to obtain a frequency-domain signal corresponding to the pulse signal as a first frequency-domain signal; wherein, the pulse signal is obtained by the first device performing inverse fast discrete Fourier transform on the first frequency-domain signal; the first frequency-domain signal is obtained by the first device as follows: dividing data bits in a data signal to be transmitted based on the number of multiple preset pilot sequences, to obtain a first sub-data signal and a second sub-data signal, and determining, as a target insertion position, an insertion position of each of the pilot sequences in a first frequency-domain signal to be generated based on data bits in the first sub-data signal, and a preset correspondence between an insertion position and data bits; combining the pilot sequences with the second sub-data signal according to the determined target insertion positions; wherein, the second sub-data signal is located at insertion positions in the first frequency-domain signal other than the target insertion positions; a second determining module 802, configured for: for each subcarrier in the first frequency-domain signal, performing correlation processing on the subcarrier and the locally stored pilot sequences, to obtain a vector corresponding to the subcarrier as a target vector; a third determining module 803, configured for: if there is a target element in the target vector, determining the subcarrier as the pilot sequence; wherein the target element is greater than an element adjacent to the target element; a fourth determining module 804, configured for: for the insertion position of each of the pilot sequences in the first frequency-domain signal, determining data bits corresponding to the insertion position based on the preset correspondence between an insertion position and data bits, to obtain the first sub-data signal; a demodulating module 805, configured for demodulating subcarriers in the first frequency-domain signal other than the pilot sequences, to obtain the second sub-data signal; a splicing module 806, configured for splicing the first sub-data signal and the second sub-data signal, to obtain the data signal sent by the first device.

Optionally, the fourth determining module 804 is specifically configured for: for the insertion position of each of the pilot sequences in the first frequency-domain signal, determining data bits corresponding to the insertion position based on the preset correspondence between an insertion position and data bits; splicing the data bits corresponding to each insertion position according to an order of insertion positions in the first frequency-domain signal, to obtain the first sub-data signal.

Based on the signal processing method provided by the embodiment of the present invention, although some subcarriers in the first frequency-domain signal also need to be set as pilot sequences, the second device can determine the data signal to be transmitted based on the insertion positions of the pilot sequences in the first frequency-domain signal. The complete data signal can also be transmitted without the need of increasing the number of subcarriers and OFDM symbols contained in the first frequency-domain signal, that is, without the need of increasing the spectrum resources used for transmitting the data signal. Furthermore, the utilization rate of spectrum resources can be improved.

Figure 9:
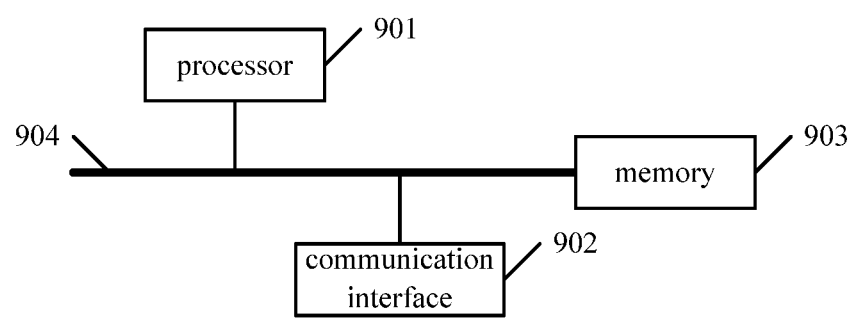
FIG. 9 is a structural view of an electronic device provided by an embodiment of the present invention.

An embodiment of the present application also provides an electronic device, as shown in FIG. 9, comprising a processor 901, a communication interface 902, a memory 903 and a communication bus 904, wherein, the processor 901, the communication interface 902, and the memory 903 are communicated with each other through the communication bus 904, and the memory 903 is configured to store a computer program; the processor 901 is configured to execute the program stored on the memory 903 to implement steps of any of the above signal processing method.

The communication bus mentioned in the above an electronic device may be a Peripheral Component Interconnect (PCI) bus or an Extended Industry Standard Architecture (EISA) bus or the like. The communication bus can be divided into an address bus, a data bus, a control bus, and the like. For convenience of representation, only one thick line is used in the drawings, but it does not mean that there is only one bus or one type of bus. The communication interface is used for communication between the an electronic device and other devices.

The memory may include a random access memory (RAM), and may also include a non-volatile memory (NVM), such as at least one disk memory. In some embodiments of the present application, the memory may also be at least one storage device located far away from the aforementioned processor.

The above-mentioned processor can be a general-purpose processor, including a central processing unit (CPU), a network processor (NP), and the like; it can also be a digital signal processor (DSP), an application specific integrated circuit (ASIC), Field-Programmable Gate Array (FPGA) or other programmable logic devices, discrete gate or transistor logic devices, discrete hardware components.

In yet another embodiment provided by the present application, a computer-readable storage medium is also provided having stored a computer program thereon which, when executed by a processor, causes the processor to perform the steps of any one of the signal processing methods.

In yet another embodiment provided by the present application, a computer program product is also provided, the computer program product includes instructions which, when executed by a computer, causes the computer to implement the steps of any one of the signal processing methods. In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be generated in whole or in part. The computer can be a general purpose computer, a special purpose computer, a computer network, or other programmable devices. The computer instructions may be stored in or transmitted from one computer-readable storage medium to another computer-readable storage medium, for example, the computer instructions may be transmitted from a website, computer, server or data transmission center to another website site, computer, server, or data center by wired (e.g., coaxial cable, fiber optic, digital subscriber line (DSL)) or wireless (e.g., infrared, wireless, microwave, etc.) means. The computer-readable storage medium may be any available medium that can be accessed by a computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a Solid State Disk (SSD)).

It should be noted that in the present specification, relational terms such as first and second are only used to distinguish one entity or operation from another entity or operation, and do not necessarily require or imply that there is such actual relationship between these entities or operations. Furthermore, the term "include", "comprise" or any other variation thereof is intended to cover a non-exclusive inclusion such that a process, method, article, or apparatus comprising a set of elements includes not only those elements, but also includes other elements not expressly listed or also include elements inherent in such a process, method, article, or device. Without further limitations, an element defined by the phrase "comprise a . . . " does not exclude the presence of additional identical elements in the process, method, article or apparatus comprising said element.

Each embodiment in the present specification is described in a related manner, the same and similar parts of each embodiment can be referred to each other, and each embodiment focuses on the differences from other embodiments. In particular, for devices, an electronic device, and computer-readable storage media, since they are basically similar to the method embodiments, the description is relatively simple, and for relevant parts, reference can be made to part of the description of the method embodiments.

The above descriptions are only preferred embodiments of the present application, and are not intended to limit the protection scope of the present application. Any modifications, equivalent replacements, improvements, and the like made within the spirit and principles of this application fall within the protection scope of this application.

What is claimed is:

1. A signal processing method, which is applied to a first device in a signal processing system that further comprises a second device, wherein the signal processing method comprises:
    dividing data bits in a data signal to be transmitted based on a number of multiple preset pilot sequences, to obtain a first sub-data signal and a second sub-data signal;
    determining, as a target insertion position, an insertion position of each of the pilot sequences in a first frequency-domain signal to be generated based on data bits in the first sub-data signal, and a preset correspondence between an insertion position and data bits;
    combining the pilot sequences with the second sub-data signal according to the determined target insertion positions, to obtain the first frequency-domain signal; wherein, the second sub-data signal is located at insertion positions in the first frequency-domain signal other than the target insertion positions;
    performing inverse fast discrete Fourier transform on the first frequency-domain signal, to obtain a pulse signal;
    sending the pulse signal to the second device, so that the second device performs discrete Fourier transform on the received pulse signal, to obtain a frequency-domain signal corresponding to the pulse signal as the first frequency-domain signal; for each subcarrier in the first frequency-domain signal, performs correlation processing on the subcarrier and the pilot sequences stored locally in the second device, to obtain a vector corresponding to the subcarrier as a target vector; if there is a target element in the target vector, then determines the subcarrier as a pilot sequence; for the insertion position of each of the pilot sequences in the first frequency-domain signal, determines data bits corresponding to the insertion position based on the preset correspondence between an insertion position and data bits, to obtain the first sub-data signal; demodulates subcarriers in the first frequency-domain signal other than the pilot sequences, to obtain the second sub-data signal; splices the first sub-data signal and the second sub-data signal, to obtain the data signal sent by the first device; wherein, the target element is greater than an element adjacent to the target element.

2. The method according to claim 1, wherein, dividing the data bits in the data signal to be transmitted based on the number of the multiple preset pilot sequences, to obtain the first sub-data signal and the second sub-data signal, comprises:
    determining a first number of consecutive data bits in the data signal to be transmitted as the first sub-data signal, wherein, the first sub-data signal is frontmost first number of data bits in the data signal to be transmitted, or the first sub-data signal is rearmost first number of data bits in the data signal to be transmitted; the first number is a preset multiple of the number of the pilot sequences;
    determining data bits in the data signal to be transmitted other than the first sub-data signal as the second sub-data signal.

3. The method according to claim 2, wherein, determining, as the target insertion position, the insertion position of each of the pilot sequences in the first frequency-domain signal to be generated based on the data bits in the first sub-data signal, and the preset correspondence between an insertion position and data bits, comprises:
    grouping the data bits in the first sub-data signal according to an order of the data bits in the first sub-data signal, to obtain multiple data bit groups; wherein, the number of data bits in each of the data bit groups is the preset multiple;
    for each of the data bit groups, determining an insertion position corresponding to the data bits in the data bit group based on the preset correspondence between an insertion position and data bits, to obtain the insertion position of each of the pilot sequences in the first frequency-domain signal to be generated, as the target insertion position.

4. The method according to claim 1, wherein, the method further comprises:
    when receiving an echo signal reflected when each of pulse signals sent by the first device in a historical time period reaches the second device, determining a distance Doppler map between the first device and the second device based on the echo signal;

calculating a distance between the first device and the second device, and a current moving speed of the second device relative to the first device based on the distance Doppler map.

5. The method according to claim 4, wherein, the echo signal is:

$$r(t) = \sum_{g=1}^{G} \rho_g s\left(t - \frac{2(R_g - v_g t)}{c}\right) e^{-j\pi f_c \frac{4(R_g - v_g t)}{c}} + \omega(t),$$

r(t) represents the echo signal, G represents a total number of second devices, C represents a speed of light, $\rho_g$ represents an attenuation coefficient of a pulse signal when transmitted between the first device and a g-th second device, $f_c$ represents a frequency of a high-frequency carrier through which a pulse signal is sent by the first device, $R_g$ represents a distance between the first device and the g-th second device, $v_g$ represents a current moving speed of the g-th second device relative to the first device, e represents a natural constant, j represents a unit of an imaginary number, ω(t) represents Gaussian white noise;

$$s\left(t - \frac{2(R_g - v_g t)}{c}\right)$$

represents a pulse signal reflected when each of pulse signals reaches the g-th second device; t represents a moment when the first device sends a first pulse signal in pulse signals;

$$\frac{2(R_g - v_g t)}{c}$$

represents a time period from when the first device sends the first pulse signal to when the first device receives the echo signal;

when receiving the echo signal reflected when each of pulse signals sent by the first device in the historical time period reaches the second device, determining the distance Doppler map between the first device and the second device based on the echo signal, comprises:

when receiving the echo signal reflected when each of pulse signals sent by the first device in the historical time period reaches the second device, sampling the echo signal according to a preset sampling interval, to obtain a sample signal, and performing discrete Fourier transform on the sample signal, to obtain a frequency-domain signal corresponding to the pulse signals as a second frequency-domain signal; wherein, the second frequency-domain signal is:

$$r[L, m, u] = \sum_{g=0}^{G} \rho_g \sum_{L=0}^{N-1} A[L, m, u] e^{j2\pi\Delta fLT/N} \times$$

$$e^{-j4\pi L\Delta f R_g/c} \times e^{j4\pi L\Delta f (mT_s + uT_{PRI})v_g/v} \times e^{j4\pi L\Delta f (LT/N)v_g/c},$$

Wherein, $\Delta f = \frac{1}{T}$, r[L, m, u] represents the second frequency-domain signal, N represents the number of subcarriers in one pulse signal, L represents sequence numbers of subcarriers in one pulse signal, and the sequence number of one subcarrier indicates a position of the subcarrier in the pulse signal, m represents sequence numbers of OFDM (Orthogonal Frequency Division Multiplexing) symbols in one pulse signal, the sequence number of one OFDM symbol represents a position of the OFDM symbol in the pulse signal, u represents sequence numbers of pulse signals sent in the historical time period, the sequence number of one pulse signal indicates the order in which the first device sends the pulse signal; A[L, m, u] represents a first frequency-domain signal corresponding to one pulse signal; T represents a duration of one OFDM symbol without a cyclic prefix added, $T_s$ represents a duration of one OFDM symbol with a cyclic prefix added, $T_{PRI}$ represents a pulse repetition interval when the first device sends the pulse signals;

performing discrete Fourier transform on the second frequency-domain signal, to obtain a third frequency-domain signal corresponding to the pulse signals; wherein, the third frequency-domain signal is:

$$P[L, m, u] = \sum_{g=1}^{G} \rho_g A[L, m, u] e^{j4\pi L\Delta f \frac{R_g}{c}} \times e^{j4\pi L\Delta f (mT_s + uT_{PRI}) \frac{v_g}{c}},$$

P[L, m, u] represents the third frequency-domain signal;

determining pilot sequences in the third frequency-domain signal as pilot signals;

performing matched filtering on the pilot signals, to obtain a fourth frequency-domain signal corresponding to the pulse signals; wherein, the fourth frequency-domain signal is:

$$E[L, k, u] = \sum_{g=1}^{G} \rho_g e^{j4\pi i\Delta f (mT_s + uT_{PRI}) \frac{v_g}{c}} e^{j4\pi i\Delta f \frac{R_g}{c}} \prod [L, k],$$

E [L, k, u] represents the fourth frequency-domain signal, Π[L, k] represents pilot sequences in one pulse signal after matched filtering; i represents the target insertion position of each of the pilot sequences in one pulse signal; k represents sequence numbers of column vectors representing the third frequency-domain signal after matched filtering, and the sequence number of one column vector represents a position of the column vector in the third frequency-domain signal;

dividing the fourth frequency-domain signal, to obtain multiple matrices to be processed; wherein, the multiple matrices to be processed correspond to the pulse signals one by one;

for each of the matrices to be processed, determining a largest element in each row vector in the matrix to be processed as a first element;

using the determined first elements in each of the matrices to be processed as a column vector, to obtain a target matrix;

performing inverse Fast Fourier transform on row vectors and column vectors of the target matrix respectively, to obtain the distance Doppler map between the first device and the second device; wherein, the distance Doppler map is:

$$E[r, v] = \sum_{r=0}^{N_1-1} \sum_{v=0}^{U-1} E[L, u] e^{j2\pi Lr/N_1} \times e^{j2\pi uv/U},$$

E[r, v] represents the distance Doppler map, U represents the number of the pulse signals, $N_1$ represents the number of pilot sequences in one pulse signal, E[L, u] represents the target matrix; r represents sequence numbers of row vectors in the distance Doppler map, the sequence number of one row vector indicates a position of the row vector in the distance Doppler map, V represents sequence numbers of column vectors in the distance Doppler map, and the sequence number of one column vector indicates a position of the column vector in the distance Doppler map.

6. The method according to claim 4, wherein, calculating the distance between the first device and the second device, and the current moving speed of the second device relative to the first device based on the distance Doppler map, comprises:

determining a sequence number of a row in the distance Doppler map where an element that is greater than a preset threshold is located, as a first value, and a sequence number of a column in the distance Doppler map where the element that is greater than the preset threshold is located, as a second value;

determining the distance between the first device and the second device based on the first value and a first preset formula; wherein, the first preset formula is:

$$R_g = \frac{x_g c}{2N\frac{1}{T}},$$

$R_g$ represents a distance between the first device and the g-th second device, C represents a speed of light, N represents the number of subcarriers in one pulse signal, and $X_g$ represents a first value corresponding to a g-th element that is greater than the preset threshold in the distance Doppler map; T represents a duration of one OFDM symbol without a cyclic prefix added;

determining the current moving speed of the second device relative to the first device based on the second value and a second preset formula; wherein, the second preset formula is:

$$v_g = \frac{\left(\frac{U}{2} - y_g\right)c}{2UT_{PRI} f_c},$$

$V_g$ represents a current moving speed of the g-th second device relative to the first device, U represents the number of pulse signals sent in the historical time period, C represents the speed of light, and $y_g$ represents a second value corresponding to the g-th element that is greater than the preset threshold in the distance Doppler map; $T_{PRI}$ represents a pulse repetition interval when the first device sends pulse signals; $f_c$ represents a frequency of a high-frequency carrier through which each of pulse signals is sent by the first device.

7. An electronic device, comprising a processor, a communication interface, a memory and a communication bus, wherein the processor, the communication interface, and the memory are communicated with each other through the communication bus;

the memory is configured to store a computer program;

the processor is configured to execute the computer program stored on the memory to implement the signal processing method of claim 1.

8. A signal processing method, which is applied to a second device in a signal processing system that further comprises a first device, wherein the signal processing method comprises:

when receiving a pulse signal sent by the first device, performing discrete Fourier transform on the pulse signal, to obtain a frequency-domain signal corresponding to the pulse signal as a first frequency-domain signal; wherein, the pulse signal is obtained by the first device performing inverse fast discrete Fourier transform on the first frequency-domain signal; the first frequency-domain signal is obtained by the first device as follows: dividing data bits in a data signal to be transmitted based on a number of multiple preset pilot sequences, to obtain a first sub-data signal and a second sub-data signal, and determining, as a target insertion position, an insertion position of each of the pilot sequences in a first frequency-domain signal to be generated based on data bits in the first sub-data signal, and a preset correspondence between an insertion position and data bits; combining the pilot sequences with the second sub-data signal according to the determined target insertion positions; wherein, the second sub-data signal is located at insertion positions in the first frequency-domain signal other than the target insertion positions;

for each subcarrier in the first frequency-domain signal, performing correlation processing on the subcarrier and the locally stored pilot sequences, to obtain a vector corresponding to the subcarrier as a target vector;

if there is a target element in the target vector, determining the subcarrier as the pilot sequence; wherein the target element is greater than an element adjacent to the target element;

for the insertion position of each of the pilot sequences in the first frequency-domain signal, determining data bits corresponding to the insertion position based on the preset correspondence between an insertion position and data bits, to obtain the first sub-data signal;

demodulating subcarriers in the first frequency-domain signal other than the pilot sequences, to obtain the second sub-data signal;

splicing the first sub-data signal and the second sub-data signal, to obtain the data signal sent by the first device.

9. The method according to claim 8, wherein, for the insertion position of each of the pilot sequences in the first frequency-domain signal, determining the data bits corresponding to the insertion position based on the preset correspondence between an insertion position and data bits, to obtain the first sub-data signal, comprises:

for the insertion position of each of the pilot sequences in the first frequency-domain signal, determining data bits corresponding to the insertion position based on the preset correspondence between an insertion position and data bits;

splicing the data bits corresponding to each insertion position according to an order of insertion positions in the first frequency-domain signal, to obtain the first sub-data signal.

10. An electronic device, comprising a processor, a communication interface, a memory and a communication bus, wherein the processor, the communication interface, and the memory are communicated with each other through the communication bus;
   the memory is configured to store a computer program;
   the processor is configured to execute the computer program stored on the memory to implement the signal processing method of claim 8.

\* \* \* \* \*